United States Patent [19]

Hahm

[11] Patent Number: 5,256,359
[45] Date of Patent: Oct. 26, 1993

[54] PROCESS FOR MANUFACTURING CAST AMORPHOUS FILM

[75] Inventor: Diane M. Hahm, Wilmington, Del.

[73] Assignee: E. I. Du Pont de Nemours and Company, Wilmington, Del.

[21] Appl. No.: 879,208

[22] Filed: May 6, 1992

[51] Int. Cl.$^5$ .......................................... B29C 41/26
[52] U.S. Cl. ................................. 264/211.12; 264/216; 425/224
[58] Field of Search ................... 264/211.12, 216, 237, 264/288.4, 146; 425/224

[56] References Cited

U.S. PATENT DOCUMENTS

| | | | |
|---|---|---|---|
| 2,995,779 | 8/1961 | Winter | 264/237 |
| 3,547,891 | 12/1970 | Snead et al. | 264/237 |
| 3,734,994 | 5/1973 | Blecha | 264/237 |
| 3,873,664 | 3/1975 | Curtis et al. | 264/146 |
| 4,066,729 | 1/1978 | Van Cappellen | 264/237 |
| 4,166,089 | 8/1979 | De Geest et al. | 264/216 |
| 4,229,407 | 10/1980 | Craig | 264/237 |

FOREIGN PATENT DOCUMENTS

| | | | |
|---|---|---|---|
| 0211649 | 2/1987 | European Pat. Off. | 264/237 |
| 58-118217 | 7/1983 | Japan | 264/237 |
| 62-170322 | 7/1987 | Japan | 264/237 |

*Primary Examiner*—Jeffery Thurlow
*Attorney, Agent, or Firm*—Konrad Kaeding

[57] ABSTRACT

The present invention is directed to an improved cast film process for manufacturing amorphous film from a polymeric material, particularly a toughened polymeric material. The improvement is directed to a simple and efficient method for obtaining appropriate, controlled orientation of a film produced from a resin such as polyester, wherein the die gap and other factors affecting orientation are properly adjusted to provide a final amorphous film having reduced aging and "splitting" problems.

7 Claims, 1 Drawing Sheet

PROCESS FOR MANUFACTURING CAST AMORPHOUS FILM

FIELD OF THE INVENTION

The present invention is directed to an improved cast film process for manufacturing amorphous film from a polymeric material, particularly a toughened polymeric material. More specifically, the improvement is directed to a simple and efficient method for obtaining appropriate, controlled orientation of a film produced from a resin such as polyester, wherein the die gap and other factors affecting orientation are properly adjusted to provide a final amorphous film having reduced aging and "splitting" problems.

BACKGROUND OF THE INVENTION

Cast film processes are well known for the manufacture of polyethylene film and the like. In such a process, molten polyethylene is generally conveyed by an extruder through an adaptor, into a slit-type die.

The die is so positioned adjacent to a main cooling roll, that the molten web emerging between the die lips contacts a water-cooled roll on a tangent to the roll surface. The speed of this first roll determines the take-off rate, and other rolls in the system are generally matched to this speed. Although the major share of cooling is accomplished on the main roll, auxiliary cooling rolls are often also used.

Cast film processes have generally not been used to produce amorphous films or toughened amorphous films. Such films generally must be oriented to improve the structural integrity of the film (prevent unwanted splitting during the manufacturing process and thereafter). Such orientation needs are problematic in a cast film processes, because over-orientated film will generally age prematurely and may have splitting problems during and after manufacture, particularly when over-orientation is in the MD or machine direction.

Prior to the present invention, it is believed that the industry did not have an understanding as to how amorphous (i.e., amorphous polyester or toughened amorphous polyester) films could be easily processed without encountering the above problems.

SUMMARY OF THE INVENTION

The present invention is directed to a casting process for producing amorphous films, particularly toughened amorphous films and most particularly toughened amorphous polyester films. The resulting films are intended to have excellent heat seal, metal adhesion and/or processability (particularly through metallization, lamination and/or bag-making).

Preferred applications for films of the present invention include metallized snack bags, lidding, non-metallized snack bags, composite can linings, coffee packages, pet-food bags, and the like. For many packaging embodiments of the present invention, advantages include excellent heat seal, aroma/flavor barrier, non-scalping, deadfold, heat resistance, printability, and the like.

The most preferred resin is a polyester, most preferably compounded with an appropriate toughening material, such as an ionomer, an acid copolymer and/or an appropriate polyethylene (such as anhydride grafted polyethylenes and the like which are known in the art for toughening). The loading of toughener in the final compound is preferably at least about 10% by weight and generally can be up to about 35% by weight.

The polyester useful in the present invention can be a homopolymer or copolymer. Possible comonomers include acids or eaters of isophthalic, azelaic, sebacic, and glycol compositions, such as, diethylene glycol; triethylene glycol; cyclohexane dimethanol; 1,4 butanediol; and the like. Other comonomers are possible and ordinary skill and experimentation may be necessary in choosing any particular copolymer system, depending upon the final properties desired for any particular embodiment of the present invention. The amount of such comonomer should generally be quite low, generally less than about .25 wt% and more preferably less than about 10 wt%.

Modifiers can also be added to the toughened material, such as antioxidants, pigments, fillers, as well as other generally known additives which would modify or improve physical properties of the material.

After a review of this specification and accompanying claims, the appropriate toughened compound to be used for any particular embodiment of the present invention may require ordinary skill and experimentation, depending upon the performance requirements of the desired final film product.

The most preferred compound is a polyester, most preferably polyethylene terephthalate ("PET") toughened with an ethylene/methacrylic acid ionomer (partially or wholly neutralized with cations).

The final film is most preferably amorphous, and polyesters are generally semi-crystalline. Consequently, to obtain the amorphous film, it is important to quickly cool the polyester melt after extrusion through the film die slot. To accomplish this, the extruded, heated film is quickly chilled on a chill roll upon exiting the die slot. The most preferred temperature of the chill roll is maintained at about 80 to 100 degrees Fahrenheit.

Orientation comes from two main sources in this cast film process. The die gap (where polymer melt is pushed through to form a film) is usually in the range of about 20 to about 45 mils. The resulting polyester film is preferably made at a thickness of about 0.4 to about 2 mils, more preferably about 1 mil, and most preferably at a thickness of about 0.5 mils. Orientation arises due to the stretching which changes the thickness of the film from the original melt curtain exiting the extrusion die slit and the final thickness of the film. If the die gap is 35 mils and the final film is 0.5 mils, the "drawdown" is 70 to 1 and the drawdown ratio is 70. If the gap were reduced to 15 mils, then the drawdown ratio would be 30.

The rolls that drive the line, pulling in the machine direction ("MD") also contribute to orientation. If several rolls are driven, the speeds must match closely or the film will be pulled. Some tension is needed however to pull the film through the entire processing line. After trying to reduce tension to a minimum and after reducing path length to a minimum, there is generally not much more that can be done to reduce unwanted "pull" orienting of the film.

Other parameters, such as the gap between the exit of the die and the chill roll, temperature of the melt (before and after engaging the chill roll) and the like, can affect MD orientation, but these generally also affect other properties and are also generally difficult to alter or modify on an industrial scale, while maintaining other necessary film parameters.

It has been discovered that the appropriate orientation for such films can generally be obtained by adjusting the die gap to achieve an appropriate drawdown ratio. The drawdown ratio should be less than about 60/1, more preferably less than about 40/1, and most preferably about 30/1. The die gap distance divided by the final film thickness should be less than about 60, more preferably less than about 40 and most preferably about 30.

Orientation is also possible in the transverse direction ("TD"). MD and TD are well recognized in the art and are defined by ASTM D1922. (TD/MD) is critical to the present invention and will hereafter be referred to as the "orientation ratio." The orientation ratio of the present invention is preferably less than about 10, more preferably less than about 6, more preferably yet when less than about 5 and most preferably about 1 (although an orientation of 1 is extremely difficult to obtain on an industrial scale and generally considered quite impractical).

DETAILED DESCRIPTION OF THE PREFERRED EMBODIMENT

The preferred amorphous resin is polyethylene terephthalate or "PET". Most preferably, the PET is toughened. The preferred toughener is an ionomer, and the most preferred ionomer is poly(ethylene/methacrylic acid) partially or wholly neutralized (most preferably about 50% neutralization) with cations, most preferably zinc.

Preferred PET resin is a standard grade PET resin having an inherent viscosity in the range of about 0.5 to about 1.0, more preferably in the range of about 0.65 to about 0.85 and most preferably in the range of about 0.65 to about 0.8. High melt viscosity PET resins are known and may be useful for the present invention, depending upon the final film properties desired; generally, higher melt viscosity resins are easier to use in a cast film process than lower melt viscosity resins. Recycled or scrap PET can also be used according to the present invention. Copolyesters are also possible, particularly those having low levels of such comonomers as isophthalic acid, dimethyl isophthalate, cyclohexane di-methanol, diethylene glycol or the like.

The preferred PET resin compound comprises about 80% by weight standard grade PET, about 15 wt % ionomer (most preferably poly[ethylene/meth-acrylic acid] about 50% neutralized with zinc), and about 5 wt % other additives such as antioxidants, stabilizers, viscosity modifiers, and/or other conventionally known resin modifiers.

Figure 1:
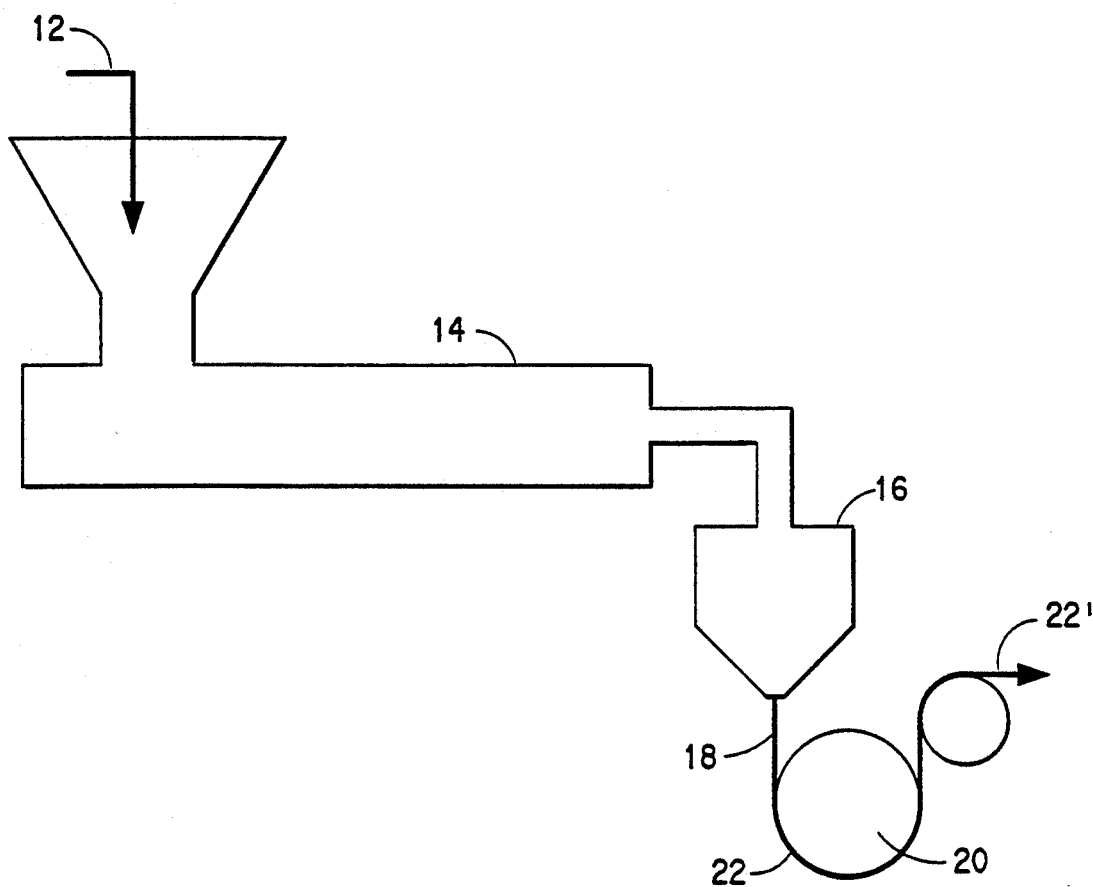
FIG. 1 illustrates the preferred cast film process of the present invention.

The preferred casting process is disclosed generally at 10 in FIG. 1. As shown in FIG. 1, any conventional extruder 14 can be used to extrude the toughened amorphous resin 12 (if polyester resin is used, it generally must come from a dryer to remove unwanted moisture). The extruder transforms the resin into a molten state and forces it through sheeting (or extrusion) die 16. The die can be of any conventional design, however, the die opening is critical to the present invention. The die opening is most preferably about 30 times wider than the final film thickness. In the preferred embodiment, the final film is preferably about 0.5 mil. and therefore the preferred die slot opening is preferably about 15 mils.

As shown in FIG. 1, the molten resin 18 exits the sheeting die 16 at an angle tangent to the chill roll 20. The preferred chilled roll is water cooled and chrome plated to a mirror finish. The sheet 22 (and 22') then moves around strip roll 20 and through a series of other rolls to the slitters and to wind-up.

Figure 2:
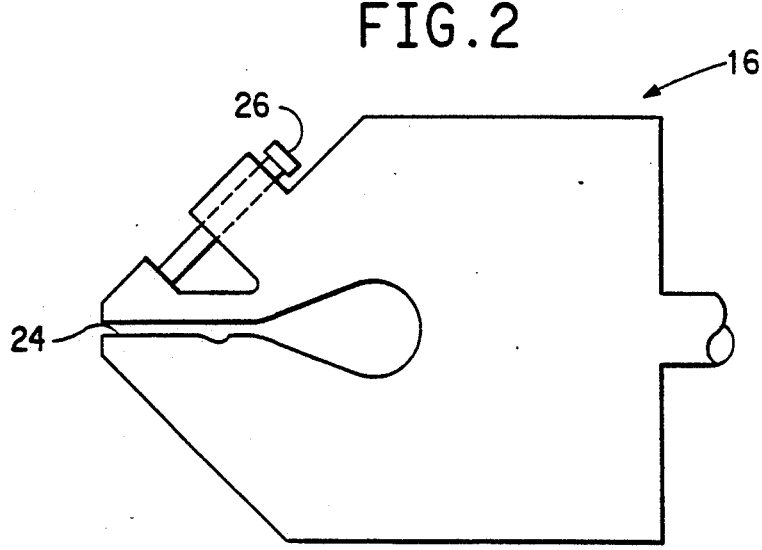
FIG. 2 is a more detailed illustration of the extrusion die of FIG. 1.

Orientation comes from two main sources in cast film. Referring to FIG. 2, the die gap 24 (where polymer is being pushed through) is usually in the range of about 20 to 45 mils and can be adjusted by die gap adjustment bolts 26. The preferred film thickness is about 0.5 mil, but could generally range from about 0.4 to about 2.0 mils. The most economical film would generally be about 0.5 mils.

The most preferred die gap ratio (the die gap divided by the film thickness) is less than about 60, more preferably less than about 50, more preferably yet, less than about 40 and most preferably about 30.

In addition, the orientation ratio is critical to the present invention and is preferably less than about 10, more preferably less than about 6, more preferably yet, less than about 5 and most preferably about 1 (although an orientation of 1 is extremely difficult to obtain on an industrial scale and generally considered quite impractical).

Table I compares a conventional blown film process to the cast film process of the present invention. Blown films, at least at low processing rates, generally have balanced orientation, and even at high rates where orientation in the machine direction ("MD") can be greater than in the transverse direction ("TD") there is generally sufficient balance in orientation to prevent splitting problems. On the other hand cast films can have much higher MD orientation relative to TD orientation, and this will generally create splitting problems.

The Elmendorf tear numbers (see, ASTM D1922) give an idea of the degree of orientation. As the polymer chains align in the machine direction ("MD"), the transverse direction ("TD") tear increases, because the polymer bonds have to break. The machine direction tear decreases, because the tear only has to break interchain forces. If the film has balanced orientation, as in low rate blown film, the tear numbers will generally be about the same.

In addition to inhibiting unwanted splitting during and after manufacture, sufficiently balanced orientation also appears to decrease the change in properties ("aging") over time of the cast film. Aging generally occurs in highly oriented films. Such highly oriented films generally develop flaws over time due to thermodynamic instability—the amorphous glassy regions continue to become more dense over time, and the heat stability and toughness decrease as a result.

TABLE I

| PROCESS | RATE[1] | (TD/MD)[2] | (PASS/FAIL)[3] | GAP RATIO[4] |
|---|---|---|---|---|
| Blown | low | 1.1 | Pass | 30 |
| Cast | low | 3.9 | " | 28 |
| Cast | high | 4.2 | " | 57 |

[1]"low" rate indicates "experimental" rates of less than about 500 lbs/hr and "high" rate indicates a "commercial" rate generally much greater than about 500 lbs/hr
[2]Elmendorf tear (GM/mil) in the transverse direction divided by the Elmendorf tear in the machine direction
[3]Pass - no splitting problems in producing the film in secondary operations
[4]Die gap divided by film thickness

What is claimed is:

1. A cast film process for the manufacture of amorphous film, said process comprising the step of heating a resin to a flowable state and extruding the heated resin through a die gap of about 3 millimeters or less, and immediately cooling the resin in an amorphous state using a quench roll having a temperature in the range of about 80°–199° F., wherein the distance of the die gap divided by the final thickness of the film is less than about 60, the Elmendorf tear strength in a TD and MD (grams per mil) ratio of TD/MD according to ASTM 1922 is less than about 10, and the final film thickness is about 1 mil or less.

2. The process of claim 1 wherein the Elmendorf tear strength in a TD and MD (grams per mil) ratio of TD/MD according to ASTM 1922 is less than about 6.

3. The process of claim 2 wherein the Elmendorf tear strength in a TD and MD (grams per mil) ratio of TD/MD according to ASTM 1922 is less than about 5.

4. The process of claim 1 wherein the resin is toughened.

5. The process of claim 4 wherein the resin is a polyester toughened with an ionomer, the Elmendorf tear strength in a TD and MD (grams per mil) ratio of TD/MD according to ASTM 1922 is less than about 7, and the the die gap divided by the final thickness of the film is less than about 45.

6. The process of claim 5 wherein the resin is polyethylene terephthalate toughened with ethylene/methacrylic acid ionomer partially or wholly neutralized with cations.

7. The process of claim 1 wherein the die gap is about 15 mils and the final film is about 0.5 mils.

* * * * *